(12) United States Patent
Spearing

(10) Patent No.: US 11,603,873 B2
(45) Date of Patent: Mar. 14, 2023

(54) HEAVY DUTY FASTENING ASSEMBLY WITH INSTALLATION VERIFICATION

(71) Applicant: A. RAYMOND ET CIE, Grenoble (FR)

(72) Inventor: Jim Raymond Spearing, Oxford, MI (US)

(73) Assignee: A. RAYMOND ET CIE, Grenoble (FR)

( * ) Notice: Subject to any disclaimer, the term of this patent is extended or adjusted under 35 U.S.C. 154(b) by 344 days.

(21) Appl. No.: 17/038,935

(22) Filed: Sep. 30, 2020

(65) Prior Publication Data

US 2022/0099120 A1 Mar. 31, 2022

(51) Int. Cl.
*F16B 5/06* (2006.01)
*F16B 21/07* (2006.01)
*F16B 1/00* (2006.01)

(52) U.S. Cl.
CPC .................................. *F16B 5/0621* (2013.01)

(58) Field of Classification Search
CPC ..... F16B 1/0071; F16B 21/073; F16B 5/0621
See application file for complete search history.

(56) References Cited

U.S. PATENT DOCUMENTS

| 1,030,386 | A | * | 6/1912 | Comeau | A41F 11/02 |
| | | | | | 24/598.5 |
| 2,250,469 | A | | 7/1941 | Crow | |
| 3,214,810 | A | | 11/1965 | Mathison | |
| 3,808,651 | A | | 5/1974 | Almendarez | |
| 4,684,305 | A | * | 8/1987 | Dubost | F16B 37/041 |
| | | | | | 411/174 |
| 4,883,397 | A | | 11/1989 | Dubost | |
| 5,539,963 | A | * | 7/1996 | Fujiwara | B42F 1/006 |
| | | | | | 24/67.5 |
| 9,488,208 | B2 | * | 11/2016 | Hemingway | F16B 21/082 |
| 2005/0105987 | A1 | * | 5/2005 | Giugliano | F16B 21/075 |
| | | | | | 411/508 |

(Continued)

FOREIGN PATENT DOCUMENTS

DE 199614 T1 10/1987
DE 69000428 T2 5/1993

(Continued)

OTHER PUBLICATIONS

Machine assisted translation of DE9210597U1 obtained from https://worldwide.espacenet.com on Feb. 27, 2019, 10 pages.

(Continued)

*Primary Examiner* — Bayan Salone
(74) *Attorney, Agent, or Firm* — Warner Norcross + Judd LLP

(57) ABSTRACT

The present disclosure provides a fastening assembly for attachment of a component. The fastening assembly is self-locking, and comprises a housing that presents a barcode, and a retention clip that is configured to form an interlock with the housing and is changeable between an open configuration adapted to freely receive a component, and a closed position adapted to capture and retain the component. The retention clip is slideably moveable within an aperture of the housing between an initial position, in which the retention clip is in the open configuration and the barcode is unreadable, and a final position, in which the retention clip is in the closed configuration and allows for the barcode to be read or scanned to verify installation of the fastening assembly on the component.

20 Claims, 7 Drawing Sheets

(56) References Cited

U.S. PATENT DOCUMENTS

| | | | |
|---|---|---|---|
| 2006/0066080 A1* | 3/2006 | Ikeda | F16B 5/065 |
| | | | 280/730.2 |
| 2008/0229550 A1* | 9/2008 | Elsner | B60R 16/0215 |
| | | | 24/16 PB |
| 2011/0154623 A1 | 6/2011 | Schmidt et al. | |
| 2012/0124782 A1 | 5/2012 | Elsner et al. | |
| 2012/0192388 A1 | 8/2012 | Demerath et al. | |
| 2013/0092803 A1 | 5/2013 | Fujiwara | |
| 2014/0017025 A1 | 1/2014 | Hemingway et al. | |
| 2015/0211565 A1* | 7/2015 | Benedetti | B60R 13/0206 |
| | | | 24/292 |
| 2015/0321622 A1* | 11/2015 | Dickinson | F16B 5/065 |
| 2017/0114809 A1 | 4/2017 | Stickelberger et al. | |
| 2021/0341002 A1* | 11/2021 | Lee | F16B 21/086 |

FOREIGN PATENT DOCUMENTS

| | | | | |
|---|---|---|---|---|
| DE | 9210597 U1 | 12/1993 | | |
| DE | 202007000938 U1 | 4/2007 | | |
| DE | 202007000938 U1 * | 5/2007 | ......... | B60R 16/0215 |
| DE | 102008038871 A1 | 2/2010 | | |
| DE | 102008059360 A1 | 6/2010 | | |
| DE | 102015202409 A1 | 8/2016 | | |
| EP | 2481935 A1 * | 8/2012 | ......... | B60R 13/0206 |
| EP | 3263916 A1 | 6/2016 | | |
| EP | 2481935 A1 | 8/2016 | | |
| EP | 3978767 A1 * | 4/2022 | ............ | F16B 5/0621 |
| WO | 2012017706 A1 | 2/2012 | | |
| WO | 2012125360 A2 | 9/2012 | | |
| WO | 2017074860 A1 | 5/2017 | | |

OTHER PUBLICATIONS

Machine assisted translation of DE102015202409A1 obtained from https://worldwideespacenet.com on Feb. 27, 2019, 17 pages.

Machine assisted translation of EP3263916A1 obtained from https://worldwide espacenet.com on Feb. 27, 2019, 11 pages.

Extended European Search Report for Application No. EP 19 21 7926, dated Apr. 29, 2020. 8 pages.

* cited by examiner

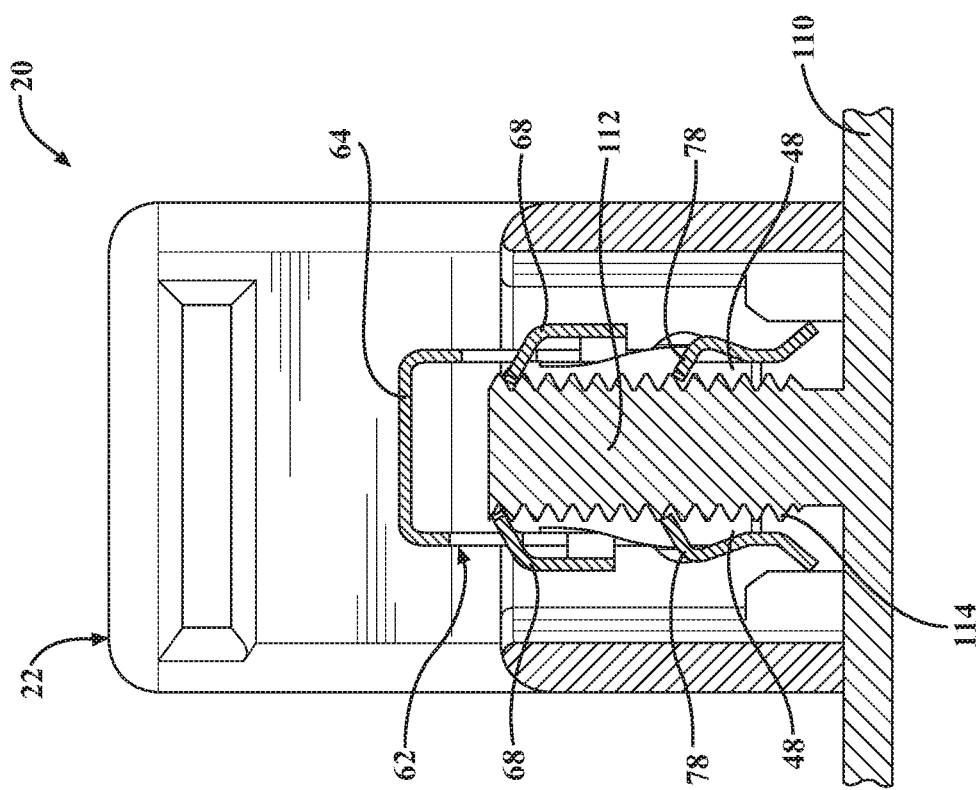
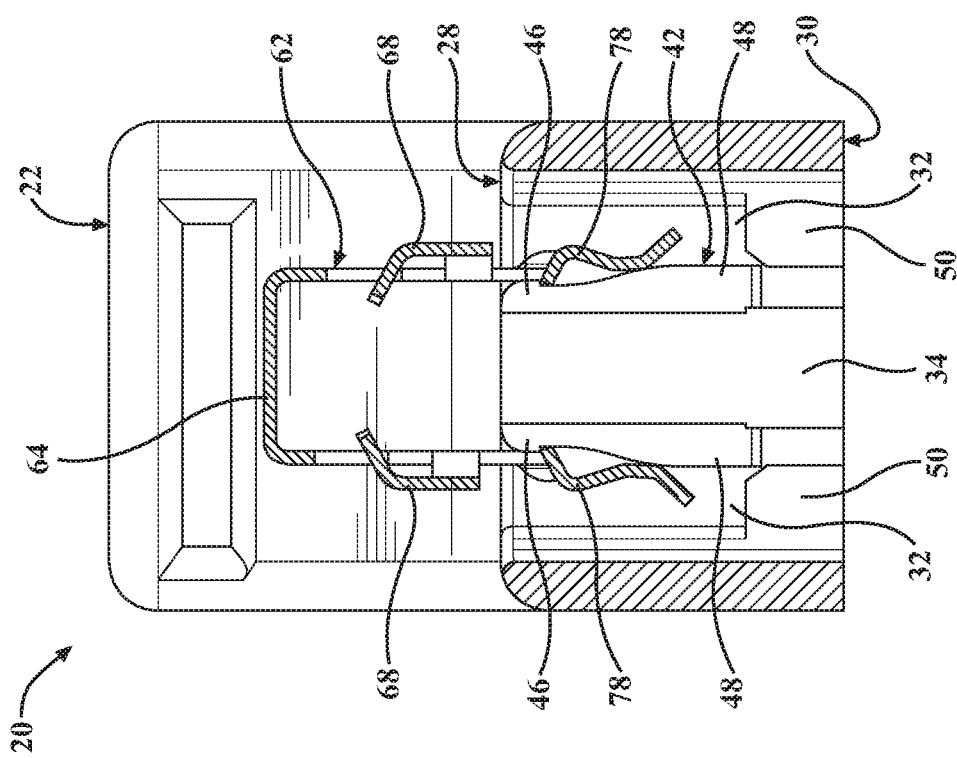

HEAVY DUTY FASTENING ASSEMBLY WITH INSTALLATION VERIFICATION

FIELD OF THE INVENTION

The present disclosure relates generally to a fastening assembly and, more specifically, to a heavy duty fastening assembly with positive installation indication for anchoring a tie strap to a component.

DESCRIPTION OF THE RELATED ART

A variety of machines and vehicles comprise panels, which are frequently utilized as structural and/or aesthetic elements in such machines across many varied industries. Frequently, panels are utilized to support various elongate objects, such as wires, cables, and other such elements that perform useful functions, and may require localized support or attachment to the panels in order to maintain proper function over time.

Often, fasteners are utilized to secure various components to panels and other similar structures. In the automotive industry, for example, tie-strap fasteners (e.g. clamp ties, lashing ties, cable ties, etc.) may be used to secure wires or cables to a vehicle frame. The diversity of potential applications for said fasteners has led to many developments in the mechanisms used to retain or install fasteners to various panels, as well as in the means used to retain objects to the fastener once installed.

Unfortunately, however, many conventional tie-strap fasteners are not adequate for securing multiple components to a single panel or structure, and suffer from numerous drawbacks associated with common fastener designs. For example, many conventional fasteners are single-use tie-strap fasteners that are difficult to install, expensive to manufacture, and unsuitable for applications where maintenance, adjustment, and/or replacement of assembly components is frequently required.

Compliance with the frequently-changing requirements of various industries, including the automotive industry, remains a challenge to current fastener designs. As such, these and other modern demands on the design and construction of fasteners mean that new solutions are needed to overcome specific problems, and at the same time continuing to improve the ease of assembly and use, provide excellent attachment strength while maintaining high reliability, and increase the production efficiency, particularly in view of increasing automation.

BRIEF SUMMARY OF THE INVENTION

A fastening assembly is provided. The fastening assembly comprises a housing and a retention clip adapted to be coupled to the housing. The housing defines an aperture, which extends between opposing upper and lower surfaces of the housing. The aperture comprises a pair of slots disposed about and connected together via a central through-hole that is adapted to receive a component from the lower surface. The housing comprises a spacer that extends inwardly toward the through-hole between the slots and presents a code region at the upper surface adjacent the through-hole, and a locking rib that projects outwardly into one of the slots from the spacer between the upper and lower surfaces. The retention clip is substantially U-shaped and comprises a pair of legs extending from opposing sides of a clip body, and a pair of locking pawls extending inwardly and toward the clip body from the legs. The clip body defines a code window adapted to be disposed about the code region of the housing, and at least one of the legs defines an elongated locking aperture adapted to receive and engage the locking rib of the housing to form an interlock therewith. The retention clip is changeable between an open configuration whereby the locking pawls are spaced apart such that a component may be freely inserted therebetween, and a closed configuration whereby the locking pawls are biased together and may capture and retain a component therebetween. The legs of the retention clip are adapted to be inserted into the slots of the aperture from the upper surface of the housing. The retention clip is slideably and linearly moveable in the aperture of the housing between an initial position (or "assembled position"), in which the retention clip is in the open configuration and the clip body is spaced apart from the upper surface of the housing, and a final position, in which the retention clip is in the closed configuration, the clip body is adjacent the upper surface of the housing such that the code window is disposed about the code region, and the locking rib is interlocked with the locking aperture.

A method of installing the fastening assembly on a component (the "installation method") is also provided. The installation method comprises inserting the legs of the retention clip into the slots of the aperture of the housing from the upper surface to place the retention clip in the initial position within the housing, such that the retention clip is in the open configuration and the clip body is spaced apart from the upper surface of the housing. The installation method also comprises inserting a stud of a component into the through-hole of the aperture of the housing from the lower surface. The installation method further comprises inserting the legs of the retention clip into the slots of the aperture to place the retention clip in the final position within the housing, such that the locking pawls of the clip capture the stud in the through-hole of the housing and the code window of the clip is disposed about the code region of the housing, thereby installing the fastening assembly on the component.

A method of anchoring a tie strap to a component with the fastening assembly (the "anchoring method") is also provided. The anchoring method comprises installing the fastening assembly on a component according to the installation method, wherein the housing of the fastening assembly further comprises a tie strap receiver adapted to receive and retain a tie strap. The anchoring method also comprises providing a tie strap, and retainably disposing the tie strap within the tie strap receiver, thereby anchoring the tie strap to the component via the fastening assembly.

These and other features and advantages of the present disclosure will become apparent from the following description of particular embodiments, when viewed in accordance with the accompanying drawings and appended claims.

DESCRIPTION OF THE DRAWINGS

FIG. 8A is a sectional view of the fastening assembly in shown in the initial position;

FIG. 8B is a sectional view of the fastening assembly shown in the final position and installed on a component.

DETAILED DESCRIPTION OF THE INVENTION

Figure 1:
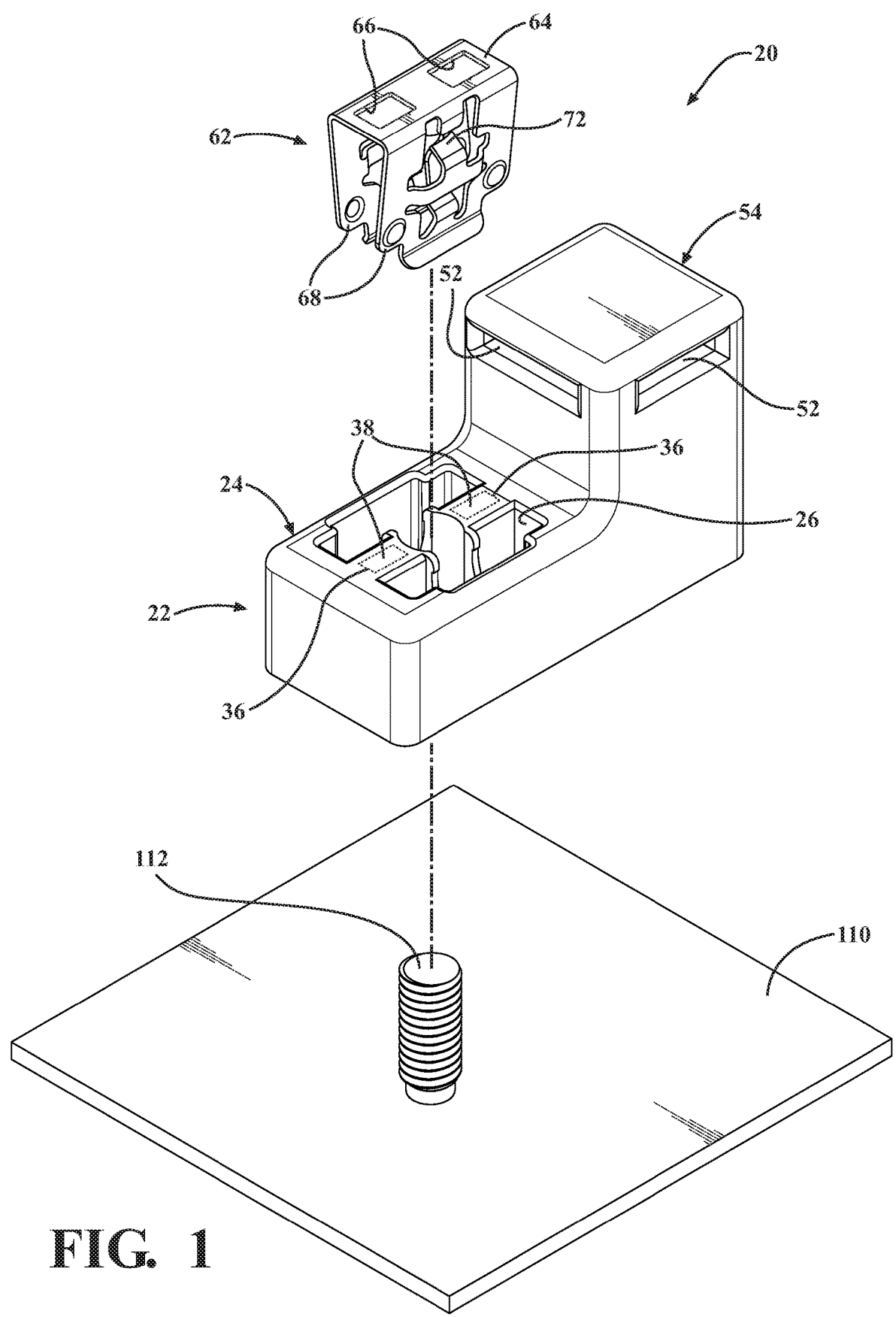
FIG. 1 is a perspective view of a fastening assembly in accordance with one embodiment, shown in an unassembled configuration, and a component.
Figure 2:
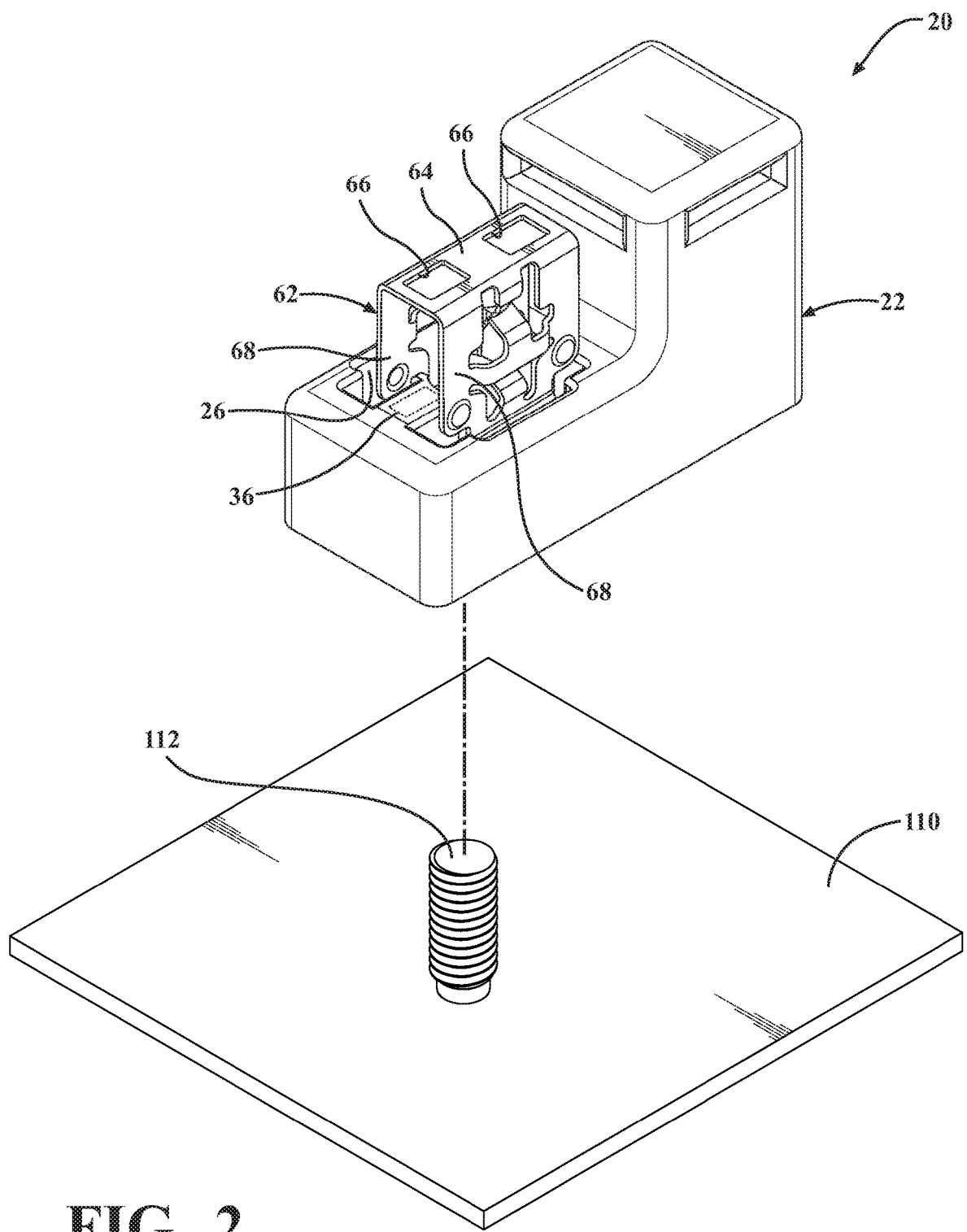
FIG. 2 is a perspective view of a component and the fastening assembly shown in an initial position.
Figure 3:
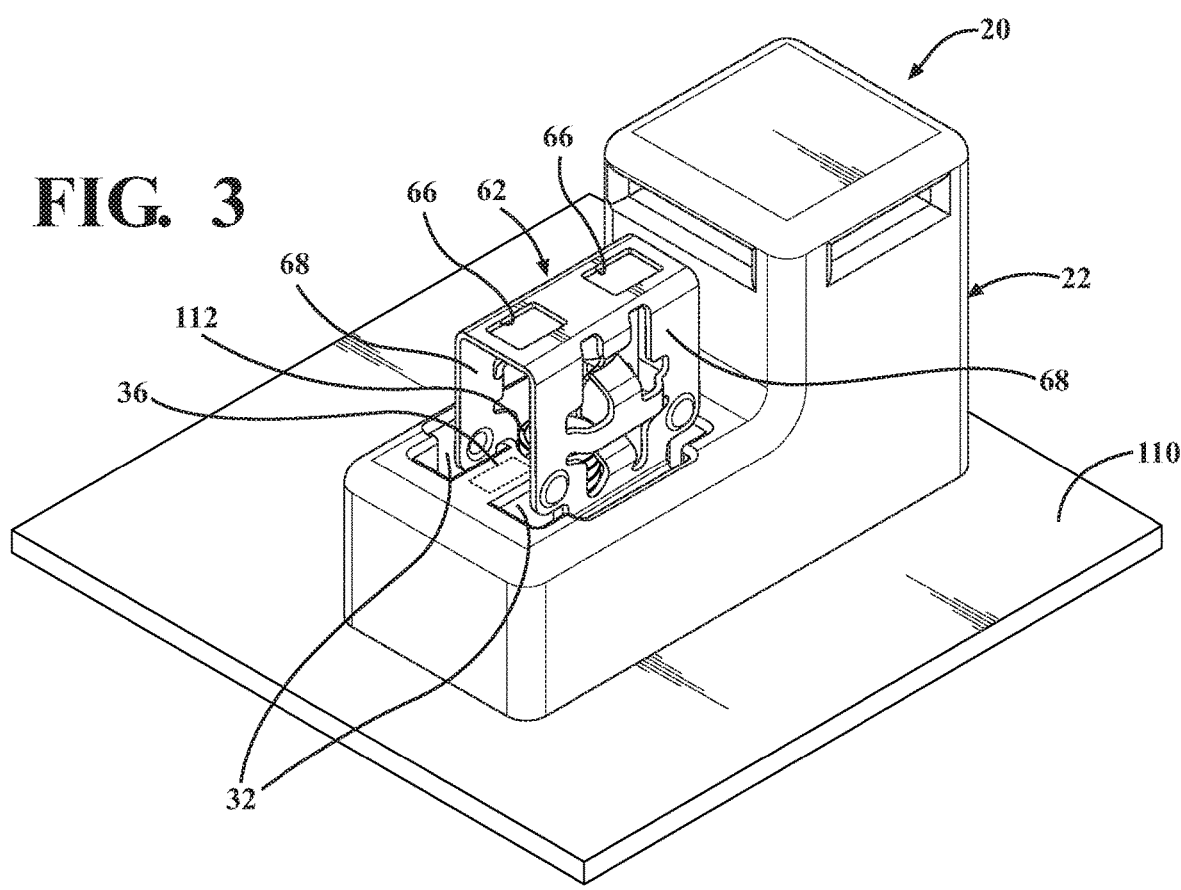
FIG. 3 is a perspective view of the fastening assembly shown in the initial position during installation on a component.
Figure 4:
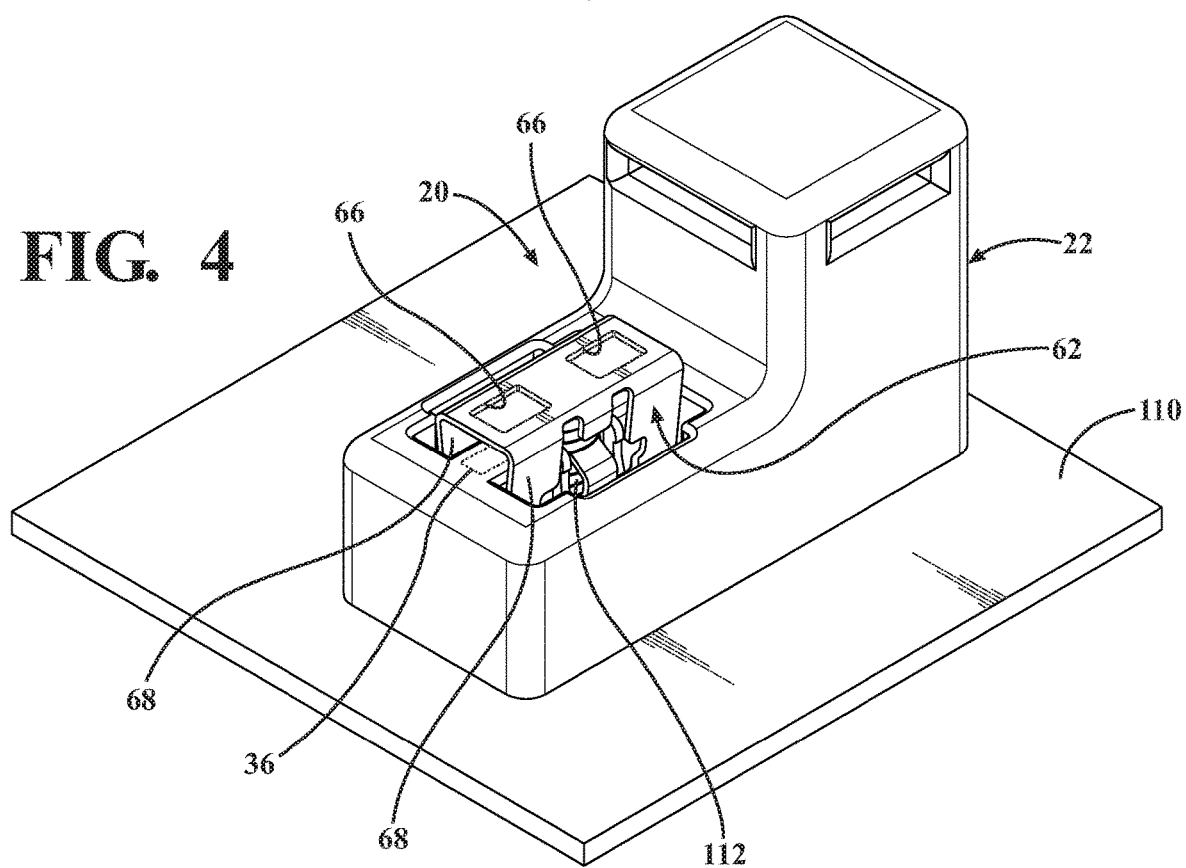
FIG. 4 is a perspective view of the fastening assembly in a final position installed on a component.

A fastening assembly is provided. The fastening assembly is configured to be installed on a component (e.g. a panel) and anchor or otherwise secure a fastening element (e.g. a tie strap) thereto. As such, as will be appreciated from the description herein, the fastening assembly has myriad end use applications across multiple industries. As but one example, the fastening assembly may be used to secure one or more objects to a panel, such as a bundle of wires to a panel comprising a stud. The unique design and material construction of the fastening assembly allows for increased attachment/retention strength once installed, increased serviceability, increased clamp load, increased durability, increased usability and convenience, reduced number of parts, as well as other benefits that will be readily apparent to those of skill in the art in view of the embodiments shown and described herein. For example, as described in particular detail below, the fastening assembly provides means for confirming proper installation via visual or electronic inspection, which may be easily and conveniently recorded, e.g. to create a record of proper installation. In certain embodiments, the fastening assembly functions through the various elements thereof, as described below, to support a cable tie in multiple orientations, thereby offering flexible application across multiple industries. In these or other embodiments, the fastening assembly functions through the various elements thereof, as described below, to allow for pre-installation assembly of the components of the fastening assembly, thereby increasing the ease of shipping and/or transit and providing a ready-to-use assembly upon arrival. These structures, features, and functions of the fastening assembly are described in further detail herein and illustrated by the particular embodiments shown in the Figures and described below, such that these and other features and advantages of the various exemplary embodiments herein will become readily apparent, especially when viewed in accordance with the accompanying drawings and the appended claims.

Referring generally to the Figures, wherein like numerals indicate corresponding parts throughout the several views, the fastening assembly is illustrated and generally designated at 20. Certain features of the fastening assembly 20 are functional, but can be implemented in different aesthetic configurations.

In general, the fastening assembly 20 comprises two primary components, namely, a housing 22 and a retention clip 62, which components are adapted to be operatively coupled together, optionally in a releasable manner, as described in further detail below. Like the fastening assembly 20 as a whole, certain features of the housing 22 and the retention clip 62, individually, are functional, but can be implemented in different aesthetic configurations.

As introduced above, the fastening assembly 20 comprises the housing 22. The housing 22 is not particularly limited in shape, size, or any particular dimension, but instead will be selected by one of skill in the art in view of the individual and collective functions of the components of the fastening assembly 20, as well as the elements thereof, described herein. In certain embodiments, exemplified by those shown in FIGS. 1-4, the housing 22 comprises two portions indicated generally as a shoulder 24, which is configured to operate with the retention clip 62 to allow for installation of the fastening assembly 20 on a component 110, and a head 54, which is configured to anchor or otherwise secure a fastening element 100 (e.g. a tie strap 100) thereto, as described in additional detail below.

For illustrative purposes, the component 110 is illustrated throughout the Figures as a generic wall or panel. However, it is to be understood that the fastening assembly 20 has broad application across multiple industries. For example, in automotive applications alone, the fastening assembly 20 can be utilized in various air bag assemblies, instrument panels, interior and exterior trim attachments, wiring harnesses, etc. As such, the component 110 is not limited, and may be any type or kind of component suitable for use with the fastening assembly 20 described herein. Typically, as shown in FIG. 1, the component 110 comprises a stud 112. The stud 112 is generally configured to be disposed within the housing 22, and secured therein with the retention clip 62, but is otherwise not particularly limited. In some embodiments, as shown in FIG. 8B, the stud 112 may comprise external threading or ridges, which, as described in further detail below, may be engaged by one or more elements of the fastening assembly 20. As but one particular example, the stud 112 may be an M6 stud bolt, which, as understood by those of skill in the art, comprises a threaded screw portion having a 6 millimeter (mm) outer diameter.

In exemplary embodiments, the shoulder 24 of the housing 22 is substantially rectangular in shape. However, the shoulder 24 is not so limited, but instead may have any shape suitable to cooperatively engage the retention clip 64 as described below. As with the housing 22 in general, the shoulder 24 may be configured to define cut-outs, e.g. to reduce the material requirements of manufacture, reduce overall weight, increase flexibility of a given portion of the housing 22, etc. Additionally, while various embodiments comprising the shoulder 24, as well as the head 54, are described herein, it is to be appreciated that these portions of the housing 22 may be integrally formed, or otherwise operatively connected together, optionally in a releasable manner, as will be understood in view of the description below. Likewise, while particular orientations and relative dimensions of the shoulder 24 and head 54 are shown and described, it is also to be appreciated that, unless otherwise indicated, the particular orientation and relative dimensions of these portions of the housing 22 are not particularly limited, and may be independently selected and configured, e.g. in view of a desired end-use application. As such, the components of the fastening assembly 20, or elements of such components, as shown in FIGS. 1-9, can be scaled differently relative to each other or the component 110 upon which the fastening assembly 20 is to be installed.

As shown in FIGS. 1-4, the housing 22 defines an aperture 26 that extends between opposing sides of the shoulder 24, namely, an upper surface 28 and a lower surface 30. As will be appreciated in view of the description herein, the aperture 26 is configured to receive a portion of the retention clip 62 from the upper surface 28 and portion of the component 110 (e.g. a stud 112) from the lower surface 30. As such, the edges of the side walls defining the aperture 26 may be configured to facilitate insertion of a component therein. For example, the aperture 26 may comprise portions that are tapered, beveled, chamfered, etc.

As shown in the exemplary embodiments, the aperture 26 may be substantially H-shaped, and generally comprises a pair of slots 32 disposed about and connected together via a central through-hole 34, i.e. such that the slots 32 form the legs of the "H" shape, and the through-hole 34 forms the bridge between the legs of the "H" shape. As illustrated via an installation sequence shown collectively in FIGS. 1-4, sequentially, the slots 32 are generally adapted to receive elements of the retention clip 62, as described below, and the through-hole 34 is adapted to be disposed about the stud 112, or another such element of component 110, consistent with the function of the fastening assembly 20 described herein. As such, in some embodiments, the through-hole is substantially cylindrical in shape and/or circular in cross-section along its length, while the slots 32 are typically more rectangular in overall shape. However, while the exemplary embodiments illustrated by the Figures present limited shapes for the slots 32 and the through-hole 34, it is to be appreciated that any shape(s) may be utilized for these features, and will be selected by those of skill in the art in view of the shape of the component 110, the retention clip 62, etc. In some embodiments, the through-hole 34 is substantially consistent in shape and side along its length. In these or other embodiments, the slots 32 comprise a narrower shape proximal the lower surface 30 as compared to the upper surface 28 of the housing 22. In some such embodiments, at least a portion of the slots 32 proximal the lower surface 30 of the housing 22 is closed (i.e., the slots 32 comprise an open end proximal the upper surface 28 and a closed end proximal the lower surface 30).

The housing 22 presents a code region 36 between the pair of slots 32 and adjacent the through-hole 34. Typically, the code region 36 comprises a barcode 38 presented at the upper surface 28 of the shoulder 24 of the housing 22. In certain embodiments, the housing 22 presents two code regions 36 disposed between the slots 32 at opposing sides of the through-hole 34. In such embodiments, the barcode 38 may be presented on but one, or, alternatively, on both of the code regions 36 (i.e., with a break/space created therebetween by the through-hole 34).

The barcode 38 is not particularly limited, and may be selected based on myriad factors, e.g. depending on a particular end-use of the fastening assembly 20, a component, article, or assembly being used therewith, etc. Particular uses of the barcode 38 are described herein with respect to features of the fastening assembly 20 as a whole. Typically, the barcode 38 comprises, alternatively is, a linear or matrix barcode. However, one of skill in the art will appreciate that the barcode 38 may comprise, alternatively may be, any visual, machine readable code. Examples of bar codes include linear bar codes and matrix (or 2D) bar codes. Examples of linear bar codes include Australia Post barcode, Codabar, Code 25-Non-interleaved 2 of 5, Code 25 Interleaved 2 of 5, Code 11, Farmacode (i.e., Code 32), Code 39, Code 49, Code 93, Code 128, CPC binary, EAN 2, EAN 5, EAN-8, EAN-13, GS1-128, GS1 DataBar, ITF-14, JAN, Japan Post bardcode, KarTrak ACI, MSI, Pharmacode, PLANET, Plessey, PostBar, POSTNET, RM4SCC/KIX, RM Mailmark L, Telepen, Universal Product Code, and the like. Examples of matrix bar codes include, but are not limited to, AR code, Aztec Code, BEEtag, Bee Tagg, Bokode, Code 1, Code 16K, ColorCode, Color Construct Code, Cronto Visual Cryptogram, CyberCode, d-touch, DataGlyphs, Data Matrix, Datastrip Code, Digimarc Barcode, DotCode, DotCode A, DWCode, EZcode, Han Xin Barcode, High Capacity Color Barcode, HueCode, InterCode, JAB-Code, MaxiCode, mCode, MMCC, NexCode, PDF417, Qode, QR code, ShotCode, Snowflake Code, SPARQCode, Trillcode, and the like.

As shown in the exemplary embodiments illustrated in the FIGS. 1-4, the slots 32 of the aperture 26 are bounded externally by an opposing pair of walls 40, and internally by a spacer 42, i.e. a portion of the shoulder 24 that extends inwardly toward the through-hole 34 between the slots 32 of the housing 22. As shown in the exemplary embodiments, the shoulder 24 may comprise more than one spacer 42, e.g. such as a pair of opposing spacers 42 that each extend inwardly toward each other between the slots 32. In such embodiments, the spacers 42 each comprise an interior face 44 that are spaced apart from one another to bound opposing sides of the through-hole 34. It is to be appreciated from the description above that, in general, each code region 36 is disposed on one of the spacers 42, with the barcode 38 being presented by the upper surface 30 of at least one, alternatively two of the spacers 42.

As shown in FIGS. 1, 7, and 8A-8B, the housing 22 comprises a locking rib 46 that projects outwardly into one of the slots 32 from the spacer 42 between the upper and lower surfaces 28, 30. More specifically, the locking rib 46 extends along an interior surface of the spacer 42 between the upper and lower surfaces 28, 30 in a direction of insertion of the aperture 26. As shown in the exemplary embodiments, the housing 22 may comprise more than one of the locking ribs 46, such as 2, 3, 4, or more of the locking ribs 46. In some embodiments, each spacer 42 comprises at least one of the locking ribs 46. In some such embodiments, each spacer 42 comprises a pair of the locking ribs 46, each projecting outwardly into the slots 32 from opposing sides of each of the spacers 42. In the embodiments where the housing 22 comprises more than one of the locking ribs 46, each of the locking ribs 46 may be the same or different from any other of the locking ribs 46, e.g. with respect to length, width, etc. Typically, however, the locking ribs 46 extend generally parallel to each other.

Figure 7:
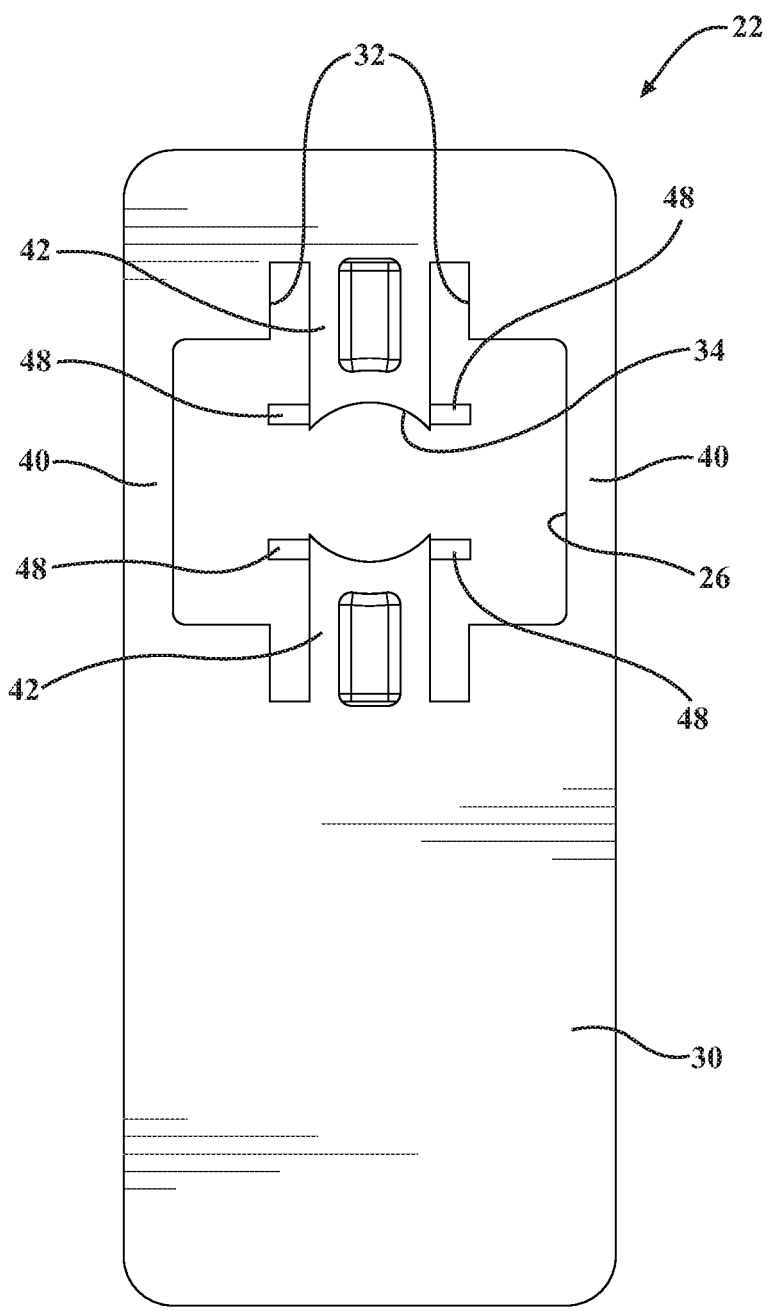
FIG. 7 is a bottom view of a housing of the fastening assembly.

As shown in FIGS. 7 and 8A-8B, the locking ribs 46 may extend from a first end (not numbered) proximal the upper surface 28 and a second end 48 proximal the lower surface 30. As will be appreciated from the further description below, the first end the locking ribs 46 may be shaped to facilitate insertion and/or sliding of elements of the retention clip 62 within the aperture 26. For example, the first end of the locking ribs 46 may be tapered, beveled, chamfered, etc. Typically, however, the second end 48 does not comprise any such cut or rounded-off edges, but instead presents a sharp transition to a bottom surface that is at least substantially perpendicular to the direction along which the locking rub 46 extends, which facilitates positive locking of the retention clip 62, as will be appreciated in view of the description of the interlock formed therewith further below. In addition to the ends (i.e., the first end and second end 48), which provide for ease of assembly/installation and positive locking of the retention clip 62, as described below, the locking ribs 46 may function generally to locate the retention clip 62 within the aperture 26 via cooperation with one or more features of the retention clip 62.

The housing 22 in general, and the shoulder 24 in particular, may comprise additional elements for increasing the functionality of the fastening assembly 20. For example, in certain embodiments, the housing 22 comprises a one or more slot bases 50 extending into the one or both of the slots 32. As exemplified by the embodiments illustrated in FIGS. 8A and 8B, the slot bases 50 may extend inwardly into the slots 32 from the walls 40 of the shoulder 24. The slot bases 50 may thus be configured to act against, or otherwise prevent sideward movement of a portion of the retention clip 62, as described in further detail below. The slot bases 50 are not particularly limited in terms of shape, size, or number of features, but instead may be independently selected and configured, e.g. based on the particular selections made with respect to the housing 22, the retention clip 62, etc. For example, in some embodiments, each slot base 50 comprises a chamfered, tapered, beveled, or rounded surface (not numbered), which may facilitate complete insertion of the retention clip 62 into the slots 32 of the shoulder 24, as will be appreciated in view of the description herein. The shoulder 24, as well as the housing 22 in general, may comprise additional elements or features, including those relevant to the function, aesthetics, use, and/or manufacturing of the housing 22, or the fastening assembly 20 as a whole. For example, while not shown, the housing 22 may comprise any number of projections, such as ribs, legs, feet, etc. configured to contact another component of the fastening assembly 20, or a component to be used therewith. Likewise, the housing 22 may define any number of apertures or voids within the structural elements thereof, such as the upper and/or lower surfaces 28, 30, the walls 40, the spacers 42, etc., e.g. to save material, reduce weight, provide attachment points for other fasteners, etc.

As introduced above, the fastening assembly 20 may be used to anchor a tie strap to a component, or a particular element of a component, such as the stud bolt 112 of the representative component 110 shown in several of the Figures (e.g. see FIGS. 1-4). For example, as illustrated by the embodiments exemplified in FIG. 1, the housing 22 may comprise a tie strap window 52 through which a free end of a tie strap or other such fastener may be disposed and, ultimately, trapped by the housing 22.

The tie strap window 52 may compose a portion of the shoulder 24, but may instead be defined by another component or element of the housing 22. For example, in some embodiments, as shown in FIG. 1, the housing 22 may comprise a head 54, which may also be referred to as a "tie strap receiver 54" herein, that defines the tie strap window 52. In general, the head 54 extends outwardly from the upper surface 28 of the shoulder 24, e.g. perpendicular to the upper surface 28. The head 54 may be connected to one end of the shoulder 24, as shown in FIG. 1, or instead connected to a different portion of the shoulder 24, such as a central portion thereof (not shown). The relative sizes of the shoulder 24 and the head 54 are not particularly limited, but will generally be selected in view of the particular component 110 to which the fastening assembly 20 is being utilized with, as well as the particular tie strap 100 or other such fastening element being anchored thereto.

As will be appreciated by those of skill in the art, the tie strap window 52 of the tie strap receiver 54 is not particularly limited, and may consist of but a simple channel or slot through with a tie strap can be inserted. In other instances, however, as illustrated by the embodiments exemplified in FIG. 9, the tie strap receiver 54 of the housing 22 defines a multi-directional window comprising intersecting channels 56, which facilitates multi-directional location of the tie strap 100 therein with respect to the housing 22. For example, as also illustrated by the embodiments exemplified in FIG. 9, the channels 56 may be configured to receive the tie strap 100 in a perpendicular and/or parallel orientation with respect to the upper and/or lower surfaces 28, 30, of the shoulder 24. Likewise, the tie strap window 52, as well as the channels 56 thereof, may comprise additional features for inserting and/or anchoring the tie strap 100 therein, such as one or more beveled or chamfered surfaces 60 for facilitating insertion of an end of the strap 100 into the tie strap window 52 and/or the channels 56 thereof.

The various component parts of the housing 22 described above (e.g. the shoulder 24, head 56, etc.), and portions of such component parts (e.g. the walls 40, spacers 42, locking ribs 46, slot bases 50, etc.) may be manufactured of the same or different material(s), such as any one or more of the materials described below. For example, in some embodiments, the shoulder 24 is monolithic (i.e., unitary) in construction and substantially homogeneous in composition. Likewise, in some embodiments, the head 56 is monolithic in construction and substantially homogeneous in composition. In these or other embodiments, the housing 22, as a whole, is monolithic in construction and substantially homogeneous in composition. However, it is to be appreciated that any component part of the housing 22, such as the shoulder 24 and/or the head 56, may independently comprise multiple component parts of varying compositions joined together. Moreover, each component part may itself comprise a combination of different materials, and thus may not comprise a homogeneous composition throughout.

In general, materials suitable for use in or as the housing 22 and/or the component parts thereof include metals (e.g. steels, aluminums, alloys, etc.), resins (e.g. thermoset and/or thermoplastic resins), and combinations thereof. However, myriad materials may be used to manufacture the component parts and various elements of the housing 22, with each typically being selected as a function of availability, cost, performance/end use applications, etc. As such, metals, metal alloys, and resins are not exhaustive of suitable materials that may be used. Additionally, it is to be appreciated a surface or portion thereof of a particular component part of the housing 22 may be coated, painted, and/or impregnated with a material having desired characteristics including, but not limited to, those described above or below. Moreover, one of skill in the art will readily appreciate that particular materials will be selected based on the features and/or functions of the housing 22 or particular component parts thereof.

In particular embodiments, the housing 22 comprises a resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the resin is selected from thermoset resins and thermoplastic resins. Examples of suitable thermoset and/or thermoplastic resins typically include polyamides (PA), such as Nylons; polyesters such as polyethylene terephthalates (PET), polybutylene terephthalates (PBT), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM) such as acetal homopolymer; polycarbonates (PC); polymethylmethacrylates (PMMA); polyvinyl chlorides (PVC); polyphenylene sulfides (PPS); polyphenylene oxide (PPO), polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; epoxy resins, urea-type (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof. Particular resins will be selected by those of skill in the art, e.g. based on material to be mixed, environment in which the fastening assembly 20 is to be used, the manufacturing method(s) and/or technique(s) selected to prepare the housing 22 and/or the component parts thereof, etc.

The housing 22 can be made via various techniques, which will typically be selected as a function of the material being utilized. For example, the housing 22 can be made via molding, extrusion, etc. In certain embodiments, the housing 22 is prepared via an additive manufacturing process, e.g. a 3-D printing process.

As introduced above, in addition to the housing 22, the fastening assembly 20 comprises the retention clip 62, which is adapted to be operatively connected or coupled to the housing 22. More specifically, as shown in the sequence illustrated in FIGS. 1-4, respectively, the retention clip 62 is adapted to be partially disposed within the aperture 26 of the housing 22, and is configured to capture and retain a component (e.g. stud 112 of component 110) therein. These and other features of the retention clip 62 will be readily apparent to one of skill in the art in view of the description below.

Figure 6:
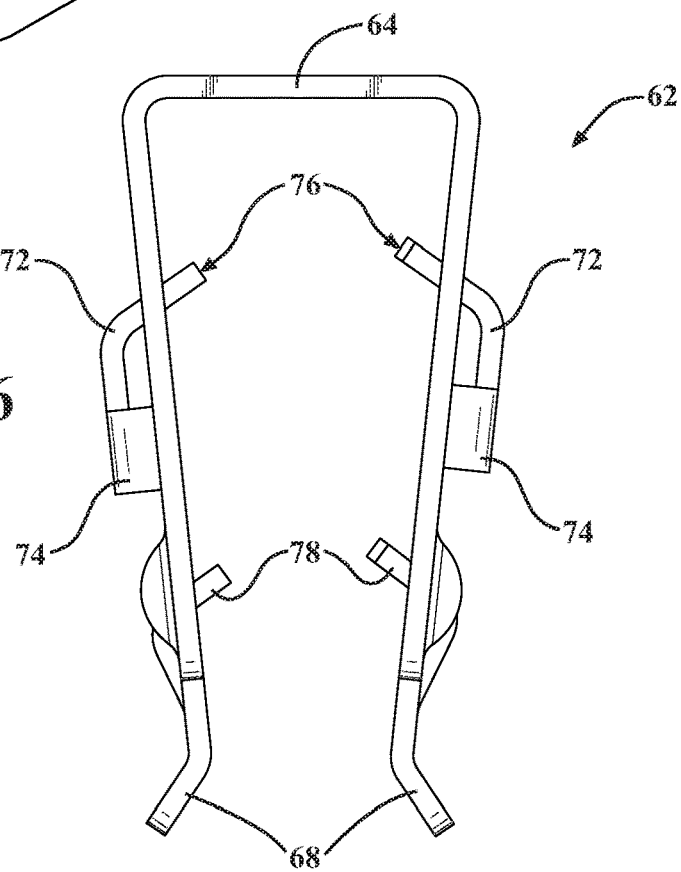
FIG. 6 is a side profile view of the retention clip of the fastening assembly.

As shown with particularity in FIG. 6, the retention clip 62 is generally "U"-shaped, and comprises a clip body 64. The clip body 64 is adapted to be disposed adjacent the upper surface 28 of the housing 22 over the aperture 26, and thus may be substantially flat, curved, or varied in structure or, optionally, configured with a shape complementary to that of the upper surface 28 presented by the spacer(s) 42.

As shown throughout the figures, the clip body 64 defines a code window 66 adapted to be disposed about the code region 36 of the housing 22. More specifically, the code window 66 is configured as a viewing port through which the code region 36 and, more particularly, the barcode 38, may be read when the clip body 64 is disposed adjacent the upper surface 28 of the housing 22 over the aperture 26, such that the code window 66 is disposed about the code region 36. However, the code window 66 is typically dimensioned, or otherwise configured, such that the code region 36 is only readable (e.g. via optical scanner, etc.) therethrough when the clip body 64 is disposed adjacent the upper surface 28 of the housing 22. In this fashion, the code window 66 and/or the clip body 64 itself may distort, obscure, or otherwise prevent or reduce the readability of the barcode 38 through the code window 66 as a function of increasing distance between the clip body 64 and the upper surface 28 of the housing 22, as described in further detail below.

As shown throughout the figures, the clip body 64 may define more that one of the code window 66, such as two three, or more code windows 66, which will each be independently selected and configured to be disposed about one or more of the code regions 36 of the housing 22. For example, in certain embodiments, the clip body 64 defines one code window 66 for each code region 36 presented by the upper surface 28 of the housing 22. In other embodiments, while not shown, the clip body 64 defines one code window 66 configured to be disposed about two or more of the code regions 36. In yet other embodiments, the clip body 64 defines two or more code windows 66 that are each configured to be disposed about an individual portion of a single code region 36 presented by the upper surface 28 of the housing 22.

Figure 5:
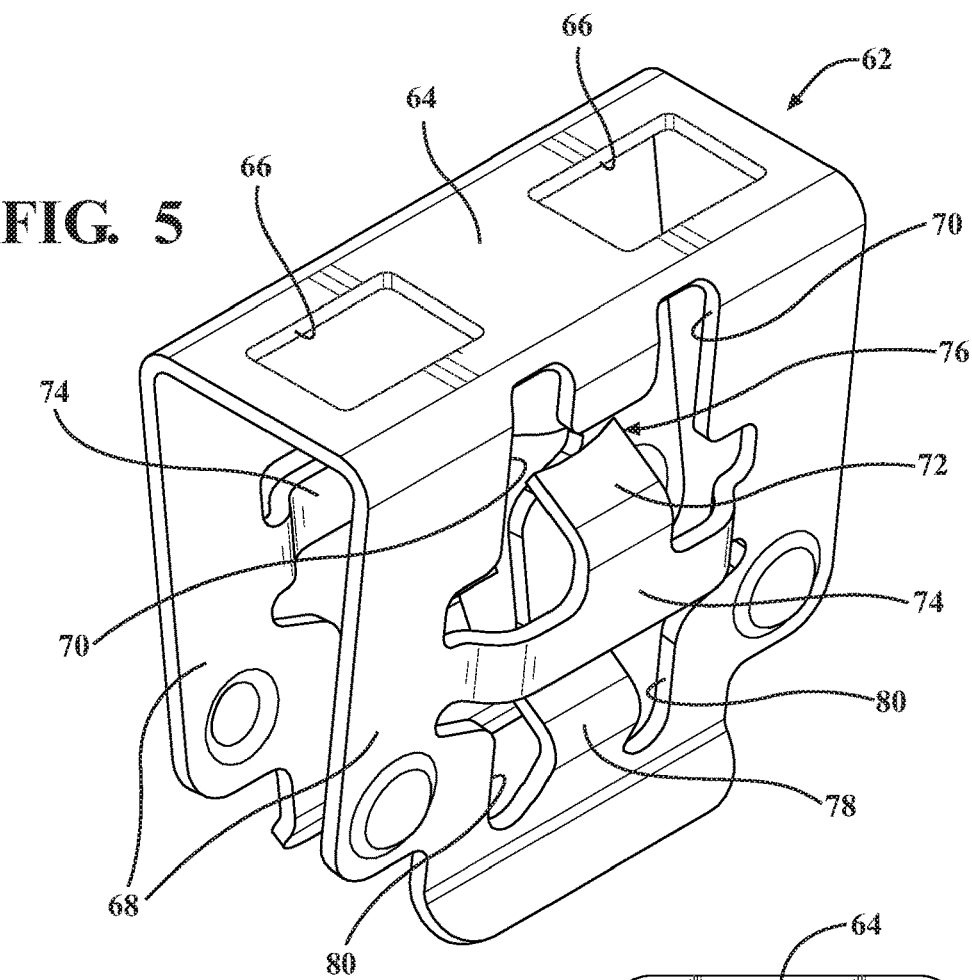
FIG. 5 is a perspective view of a retention clip of the fastening assembly.

As shown in FIGS. 5 and 6, the retention clip 62 comprises a pair of legs 68, which extend outwardly from opposing sides of the clip body 64, e.g. generally perpendicular to the clip body 64, to provide the retention clip 62 with a side profile having the overall "U" shape with respect to at least the legs 68 and the clip body 64. As shown in FIG. 7, each of the legs 68 is generally flat in profile, with the legs 68 being spaced apart and configured in a generally face-to-face orientation with respect to each other and defining a gap therebetween. So configured, the clip body 64 forms a "closed" end of the retention clip 62, i.e., via extending between and connecting together ends of the legs 68 and thereby closing one end of the gap therebetween. Likewise, the retention clip 62 comprises an "open" end comprising a terminal portion of each of the legs 68 opposite the clip body 64, where the legs 68 are spaced apart from each other and define a portion of the gap between the terminal portions. It is to be appreciated that the gap need not be consistent between all portions of the legs 68, but may instead increase or decrease along the length of the retention clip 62 between the open and closed ends. For example, in certain embodiments, the legs 68 extend outwardly and toward each other from opposing sides of the clip body 64, such that, while still spaced apart, the legs 68 are closer together at the open end than at the closed end. In such embodiments, which may be better understood in view of the additional description below, the retention clip 62 is configured to provide a clamping force between the legs 68 (e.g. via a spring force biasing the legs 68 together) when the legs 68 are spread apart.

It is to be appreciated that the clip body 64 may be a separate component part of the retention clip 62 or, alternatively, may instead be an end wall or other such structural portion unitary in construction with one or both of the legs 68. As such, the U-shaped portion of the retention clip 62 may comprise separable components or, alternatively, may be monolithic in construction. In certain embodiments, the clip body 64 and the legs 68 are monolithic in construction. In some such embodiments, the retention clip 62 is formed from a single piece of material, e.g. via forming (e.g. bending, shaping, etc.), machining, extruding, etc., or combinations of such processes.

With further reference to the sequence illustrated collectively in FIGS. 1-4, respectively, the legs 68 of the retention clip 62 are adapted to be inserted into the slots 32 of the aperture 26 of the housing 22 from the upper surface 28 thereof, with the closed end of the retention clip 62 being configured to be disposed about a portion of the spacer(s) 42 proximal the upper surface 28 of the housing 22 and, upon insertion, locate the code window 66 of the retention clip 62 about the code region 36 of the housing 22. As such, the overall and relative size, shape, and/or dimensions of the retention clip 62 and the housing 22 will be selected in view of each other to provide a complementary fit and engagement of the interacting portions thereof. For example, as will be understood by those of skill in the art, the legs 68 will typically be dimensioned to correspond to the interior size and/or shape of the slots 32. However, the legs 68 are not limited beyond the portions and elements thereof described herein, and the corresponding size/shape limitations necessary to preserve the functions of the retention clip 62 with the housing 22, such that any overall and/or specific shape may be utilized within those bounds. For example, while the slots 32 may be generally straight and substantially consistent along the length thereof (e.g. with respect to diameter, width, depth, cross-sectional shape, etc.), the legs 68 may be flared apart from one another at the open end of the retention clip 62, as shown generally in FIG. 6. Such a feature may be included in order to facilitate insertion of the legs 68 into the slots 32, e.g. by providing a transitional surface that may contact the interior faces 44 of the spacer 42 upon insertion, thereby forcing the legs 68 apart from each other. This collective function and relative positioning of the retention clip 62 and the housing 22 is described in further detail below.

In general, at least one of the legs 68 of the retention clip 62 defines a locking aperture 70. The locking aperture 70 is not particularly limited, and typically comprises a narrow, elongated depression, groove, notch, slit, or aperture for receiving or admitting the locking rib 46 of the housing 22. As described in further detail below, the locking aperture 70 is adapted to receive and engage the locking rib 46 of the housing 22 to form an interlock therewith. As such, the leg 68 typically defines the locking aperture 70 along a length extending between the clip body 62 and the terminal end of the leg 68, such that the locking aperture 70 will be coextensive with the locking rib 46 when the legs 68 of the retention clip 62 are inserted into the slots 32 of the housing 22. In certain embodiments, the locking aperture 70 is be disposed orthogonal to the clip body 64, i.e., where the lengthwise extension of the locking aperture 70 is orthogonal, or generally orthogonal, to the clip body 64, to cooperate with the locking rib 46 and ensure the retention clip 62 slides orthogonally relative to the upper and lower surfaces 28, 30 of the housing 22.

As introduced above, the housing 22 may comprise more than one of the locking rib 46. Accordingly, it will be appreciated that the retention clip 62 may similarly comprise more than one of the locking apertures 70, such as two, three, four, or more individual locking apertures 70, which will be selected based on the locking ribs 46 of the housing 22 being utilized. In certain embodiments, such as those exemplified by FIG. 5, each of the legs 68 of the retention clip 62 defines a pair of the locking apertures 70, which are typically disposed in a parallel spaced-apart relationship on the defining leg 68.

With continued reference to the exemplary embodiments illustrated in FIG. 5, the retention clip 62 typically comprises a locking pawl 72, which extends inwardly and toward the clip body 64 from one of the legs 68. In some embodiments, the locking pawl 72 extends from a pawl base 74 disposed on one of the legs 68 of the retention clip 62, to a terminal end 76 adapted to contact and engage a component (e.g. the stud 112 of the exemplary component 110). So configured, the locking pawl 72 is adapted to capture and retain stud 112 within the housing 22, i.e., upon insertion of the stud 112 into the housing 22 from the lower surface 30 and insertion of the legs 68 of the retention clip 62 into the slots 32 of the housing 22. More specifically, upon such insertion of the legs 68 of the retention clip 62 into the slots 32 of the housing 22, the locking pawl 72 is configured to inwardly extend from the pawl base 74 within one of the slots 32 into the through-hole 34 and toward the upper surface 28 of the housing 22. In this fashion, the terminal end 76 is positioned to retainably engage the stud 112 (i.e., when inserted into the through-hole 34 from the lower surface 30 of the housing 22) to prevent withdrawal of the stud 112 therefrom. In certain embodiments, where the stud 112 comprises the ridges or threads 114, as shown in FIG. 8B, the terminal end 76 of the locking pawl 72 may be configured to engage the ridges or threads 114, e.g. in order to provide a more secure capture of the stud 112. It will be appreciated that the direction of extension of the locking pawl 72 into the through-hole 34 with respect to the orientation of the through-hole 34 (i.e., the relative angle between the locking pawl 72 and a central axis of the through-hole 34) may be selected to tune the force needed to insert the stud 112 into the through-hole 34 when the terminal end 76 of the locking pawl 72 is positioned therein, was well as the retaining force provided by the locking pawl 72 engaging the stud 112.

In some embodiments, the retention clip 62 comprises at least two of the locking pawls 72. For example, in some such embodiments, the retention clip 62 comprises a pair of opposing locking pawls 72 that extend inwardly and toward the clip body 64 from the legs 68. In such embodiments, the terminal ends 76 of the locking pawls 72 are adapted to extend inwardly toward each other to receive and retain a component (e.g. the stud 112) therebetween. As such, the terminal ends 76 are typically configured to be spaced apart for a distance that is less than the diameter of a component to be captured therebetween. As such, upon insertion of a component (e.g. the stud 112) between the terminal ends 76 of the locking pawls 72, the terminal ends 76 are biased toward and engage the component therebetween.

It is to be appreciated that the retention clip 62 may comprise more than one pair of the locking pawls 72, such as two, three, or more pairs of the locking pawls 72. For example, in some embodiments, as exemplified by those shown in FIGS. 5 and 6, the retention clip 62 comprises a second pair of locking pawls 72, which are indicated generally at 78. In certain such embodiments, the locking pawls of the second pair 78 is disposed in line with one of the locking pawls 72, such that the terminal ends 76 of all locking pawls 72 are configured to contact a component (e.g. the stud 112) when inserted there between.

As introduced above, the legs 68 are typically spaced apart from each other at the open end of the retention clip 62 in a resting, or natural, position (i.e., a "closed configuration"), to provide the gap between the terminal portions of the legs 68. However, as introduced above, the terminal portions of the legs 68 may be forced further apart to increase the length of the gap therebetween, placing the retention clip 62 in an "open configuration", where the legs 68 are biased toward the closed configuration and thus provide a clamping force therebetween. As such, it is to be appreciated that the retention clip 62 is changeable between the open configuration, whereby an element may be inserted between the legs 68, and a closed configuration, whereby legs 68 are biased together and may capture and retain such an element therebetween. Likewise, the locking pawls 72 may also be spaced apart in the open configuration (e.g. by virtue of being connected to the legs 68 being spread apart) to allow for free insertion of a component (e.g. the stud 112) therebetween, and biased together in the closed configuration to capture and retain the component therebetween.

In certain embodiments, the retention clip 62 is symmetric about a central plane (i.e., is bilaterally symmetric). For example, in some such embodiments, the retention clip 62 is symmetric about a central place bisecting both of the legs 68 through a midline. In these or other embodiments, the retention clip 62 is symmetric along a midline separating the legs 68. In yet other embodiments, the retention clip 62 is asymmetric.

In general, materials suitable for use in or as the retention clip 62 and/or the component parts thereof include metals (e.g. steels, aluminums, alloys, etc.), resins (e.g. thermoset and/or thermoplastic resins), and combinations thereof. However, myriad materials may be used to manufacture the component parts and various elements of the retention clip 62, with each typically being selected as a function of availability, cost, performance/end use applications, etc. As such, metals, metal alloys, and resins are not exhaustive of suitable materials that may be used. Additionally, it is to be appreciated a surface or portion thereof of a particular component part of the retention clip 62 may be coated, painted, and/or impregnated with a material having desired characteristics including, but not limited to, those described above or below. Moreover, one of skill in the art will readily appreciate that particular materials will be selected based on the features and/or functions of the retention clip 62 or particular component parts thereof. In certain embodiments, the retention clip 62 is monolithic in construction and substantially homogeneous in composition. In some such embodiments, the retention clip 62 comprises a metal or metal alloy, such as steel, stainless steel, carbon steel, aluminum, etc.

The retention clip 62 may be made via various techniques, which will typically be selected as a function of the material being utilized. For example, in some embodiments, the retention clip 62 is formed via stamping and forming, e.g. from a metal sheet.

It will be appreciated that the particular selection and properties of each of the various elements of the housing 22 and the retention clip 62 are adapted to conform with the various other elements of the fastening assembly 20, e.g. to perform the desired function of the particular element or a combination of particular elements. For example, it will be understood that the size and shape of each locking aperture 70 will be independently selected to conform to the size and shape of corresponding locking ribs 48, i.e. to form the interlock described herein. Similarly, the shape, size, and orientation of each slot base 50 are independently selected to conform to the shape, size, etc. of the legs 68, as well as the desired serviceability of the fastening assembly 20 as a whole. Likewise, the walls 40 will be independently dimensioned to control the size of the slots 32, and thus, in conjunction with the slot bases 50, control the lateral movement of the legs 68 when the retention clip 62 is in the final position.

Figure 9:
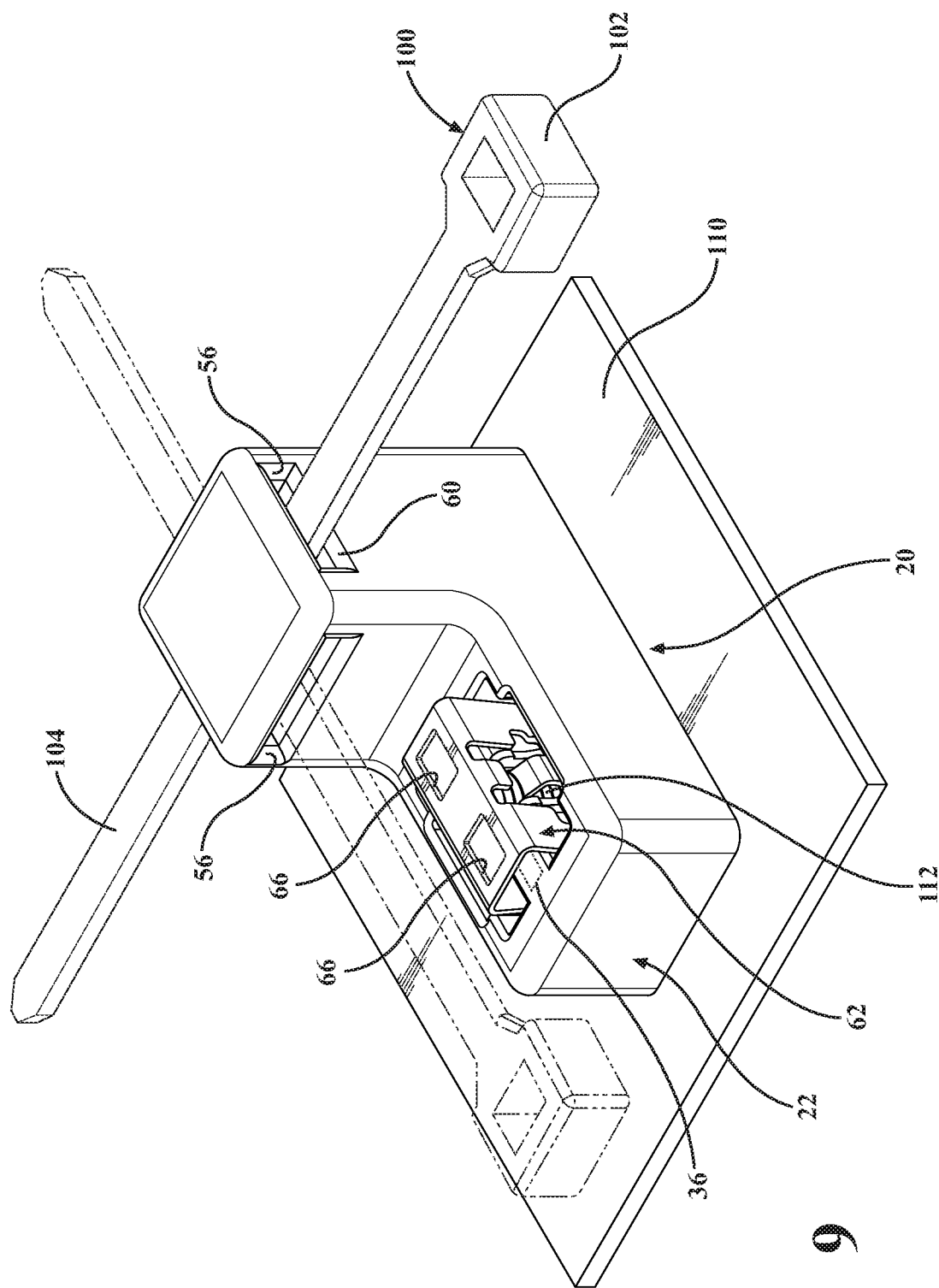
FIG. 9 is a perspective view of the fastening assembly installed on a component and anchoring a tie strap thereto.

In some embodiments, the fastening assembly 20 comprises a tie strap or other such fastening element, such as the tie strap 100 shown in FIG. 9. The tie strap 100 is not limited, and generally comprises a head 102 and an elongate body 104 adapted for being disposed within and captured/locked by a portion of the head 102. The elongate body 104 is configured to be disposed within the tie strap window 52 or the intersecting channels 56, of the housing 22, e.g. depending on the particular configuration of the tie strap receiver 54 being utilized. The tie strap 100 typically comprises a resin or other polymeric material, such as any one or more of those described herein. The tie strap 100 may be releasable or, alternatively, may be a single-use tie strap fastener. As will be understood by those of skill in the art, the tie strap 100 may function to secure one or more objects to the fastening assembly 20 and, optionally, to a component on which the fastening assembly 20 is installed. For example, the tie strap 100 may be configured to secure a bundle of cables or wires together, such that the fastening assembly 20 as a whole is configured to fasten the bundle of cables or wires to a component such as a panel. In some embodiments, the fastening assembly 20 comprises multiple tie straps 100, which are each independently selected, and may be disposed within any of the tie strap window 52 or channels 56, in one or more orientations.

As introduced above, the housing 22 and the retention clip 62 are adapted to be operatively coupled together, with the legs 68 of the retention clip 62 being configured for insertion into the slots 32 of the housing 22, and the locking aperture 70 of the retention clip 62 being adapted to receive and engage the locking rib 46 of the housing 22 to form an interlock therewith, as described further below. In general, the retention clip 62 is slideably and linearly moveable within the aperture 26 of the housing 22 between an initial/assembled position and a final position, shown in FIGS. 8A and 8B, respectively.

More specifically, in the initial position, as shown in FIG. 8A, the retention clip 62 is in the open configuration, with the legs 68 being only partially inserted into the slots 32, and the clip body 64 being spaced apart from the upper surface 28 of the housing 22. In the initial position, the relative positions of the housing 22 and the retention clip 62 renders the barcode 38 difficult to read, due to the retention clip 62 obscuring the barcode 38 from view from many angles, as well as the distance between the clip body 64 and the upper surface 28, and thus between the code region 36 and the code window 66, distorting a reading of the barcode 38.

In the final position, as shown in FIG. 8B, the retention clip 62 is in the closed configuration, with the legs 68 being fully, or mostly, inserted into the slots 32, such that the clip body 64 is disposed adjacent the upper surface 28 of the housing 22, with the code window 66 of the retention clip 62 being disposed about the code region 36 of the housing 22. As such, in the final position, the barcode 38 is readable through the code window 66.

It will be appreciated from the description of the initial and final positions above, and the respective readability of the barcode 38 in each of the positions, that the fastening assembly 20 provides unique benefits in applications where proper (e.g. full, complete, etc.) installation is desired. In particular, a user can quickly and accurately determine an installation state of the fastening assembly 20 via attempting to read the barcode 38 of the housing 22, e.g. using a hand-held scanner. A positive read of the barcode 38 may be used as verification that the final position was reached, with the retention clip 62 being in the closed configuration and thus fully seated about the stud 112. Comparatively, a read failure due to lack of access or clear scanability of the barcode 38 may indicate the fastening assembly 20 is not in the final position, with the retention clip 62 instead being in the open configuration and thus not fully seated about the stud 112. In either case, the verification can be easily recorded, e.g. manually or automatically, via computer, handheld scanner, by hand, etc. As such, the unique design of the fastening assembly 20 conveniently provides a recordable verification of proper assembly of the component parts (i.e., the housing 22 and the retention clip 62), as well as installation of the fastening assembly 20 as a whole.

It is to be understood from the description and Figures herein, the interlock formed via cooperative engagement of the locking ribs 46 of the housing 22 and the locking apertures 70 of the retention clip 62 is generally configured to coordinate the relative movement between the retention clip 62 and the housing 22 during assembly and/or installation. In particular, the interlock is typically configured to constrain the legs 68 to linear movement within the aperture 26. Moreover, the interlock also provides means for securing the retention clip 62 in the final position and closed configuration during installation, thereby ensuring that a maximum locking tension may be applied to the stud 112 captured by the locking pawls 72, and a maximum clamp load may be achieved for the fastening assembly 20 as a whole.

As exemplified by the embodiments shown in FIGS. 8A and 8B, the interlock is generally formed via engagement or registry of the locking rib 46 of the housing 22 with the locking aperture 70 of the retention clip 62. It will be appreciated in view of the embodiments described above, however, that the interlock may be formed in such a manner with multiple locking ribs 46 and multiple locking apertures 70. For example, in the embodiments shown in FIGS. 8A and 8B, the interlock is formed via registry of two pairs (i.e., four total) locking ribs 46 and two pairs (i.e., four total) locking apertures 70. With reference to FIG. 8A and the description of the locking ribs 46 above, it is also to be appreciated that the first end of the locking ribs 46, which may comprise a tapered portion with a beveled or chamfered edge, can initiate a wedging action against the legs 68 during initial insertion into the slots 32 by engaging the terminal portions of the legs 68, thereby forcing the retention clip 62 into the open configuration during insertion.

In certain embodiments, the fastening assembly 20 includes a latch associated with the interlock to limit the slideable withdrawal of the retention clip 62 from the housing 22. For example, in some such embodiments, the latch is configured to prevent slideable withdrawal of the retention clip 62 from the housing 22 past the initial position, i.e., to prevent disassembly/separation of the components of the fastening assembly 20, such as during shipping. In these or other embodiments, the latch is configured to prevent any appreciable amount of slideable withdrawal of the retention clip 62 from the housing 22 once the final position is achieved, e.g. to lock the fastening assembly 20 in place once installed.

Typically, the latch comprises an engagement between the bottom surface of the second end 48 of the locking ribs 46 with a closed end of the locking apertures 70. More specifically, during initial insertion of the retention clip 62 into the housing 22, as shown in FIG. 8A, the retention clip 62 is forced into the open configuration as described above, such that the closed ends of the locking apertures 70 proximal the open end of the retention clip 62 are spread around the first end of the locking ribs 46, thereby allowing for slideable passage of the legs 68 into the slots 32 and locating the first ends of the locking ribs 46 within the locking apertures 70. In some embodiments, where the first ends of the locking ribs 46 comprise a ledge or barb facing into the aperture 26, the engagement of the first ends of the locking ribs 46 with the closed end of the locking apertures 70 will prevent withdrawal of the retention clip 62 from the housing 22 past the initial position. The widely spaced relationship of the locking pawls 72 provided by the open configuration of the of the retention clip 62 during this stage of installation or assembly may be utilized to increase the ease of insertion of the stud 112 into the through-hole from the lower surface 30 by preventing engagement of the terminal ends 76 with the stud 112 until the retention clip 62 is further inserted into the aperture 26. Moreover, this same feature allows for pre-assembly of the fastening assembly 20, into the initial position, prior to shipping, ensuring the fastening assembly 20 is ready to use upon reaching an end destination.

Upon further insertion of the retention clip 62 into the housing 22 beyond the initial position, as shown in FIG. 8B, the closed ends of the locking apertures 70 are moved past the second end 48 of the locking ribs 46, thereby allowing the retention clip 62 to return to the closed configuration and seat the locking ribs 46 fully within the locking apertures 70. In this configuration, the closed ends of the locking apertures 70 are positioned adjacent the bottom surfaces of the second ends 48 of the locking ribs 46, thereby limiting slidable movement and preventing slideable withdrawal of the retention clip 62 from the housing 22, and securing the fastening assembly 20 in the final position.

It will be appreciated that, in some embodiments, the retention clip 62 may be released from the housing 22, even when the fastening assembly 20 is locked in the final position via the latch, by forcing apart the terminal portions of the legs 68 to disengage/remove the locking ribs 46 from within the locking apertures 70 and allow for slidable movement of the retention clip 62 within the housing 22. Likewise, when in the initial position, similar a wayward movement of the terminal portions of the legs 68 may be utilized to disengage/remove the first end of the locking ribs 46 from within the locking apertures 70, and thereby permit withdrawal of the retention clip 62 from the housing 22 past the initial position, and thus disassembly of the fastening assembly 20. This release and/or disassembly may be utilized to recycle, repurpose, re-install, or otherwise service the fastening assembly 20 after installation. In other embodiments, however, the walls 40 and/or the slot bases 50 are configured to limit the lateral movement of the legs 68 within the slots 32. In some such embodiments, this configuration of the housing 22 prevents release and/or disassembly of the fastening assembly 20 as described above, but instead provides the fastening assembly 20 with an increased load capacity by interfering with any deformation of the retention clip 62 (e.g. as a result of pulling the fastening assembly 20 and the component 110 away from each other), and instead translating such force back into a clamping force by driving the locking pawls 72 into the stud 112. In some such embodiments, however, the fastening assembly 20 may still be configured for selective removal from the stud 112, e.g. for serviceability. For example, in certain embodiments where the stud 112 comprises the threads 114, as shown in FIG. 8B, the locking pawl 72 is configured to engage the threads 114 of the stud 112 when in the closed configuration (e.g. upon installation). In such embodiments, the fastening assembly 20 will strongly resist withdrawal of the stud 112 from the aperture 26, such that removal of the fastening assembly 20 will not be readily achievable via pulling the housing 22 from the stud 112 and/or the component 110. However, in some of these embodiment, the housing 22 may be twisted to "unscrew" the fastening assembly 20 from the stud 112, and thus remove/uninstall the fastening assembly 20 from the component 110.

A method of installing the fastening assembly 20 on the component 110 (the "installation method") is also provided. The installation method is to be understood in view of the description above relating to the various components of the fastening assembly 20, as well as the individual and collective functions thereof. In general, the installation method comprises inserting the stud 112 into the through-hole 34 from the lower surface 30 of the housing 22, and placing the retention clip 62 into the final position, thereby capturing the stud 112 with the retention clip 62 and installing the fastening assembly 20 on the component 110.

In some embodiments, the installation method comprises providing the fastening assembly 20 in an unassembled state, i.e., with the retention clip 62 wholly separate from the housing 22. In such embodiments, the installation method comprises assembling the fastening assembly 20, e.g. via inserting the legs 68 of the retention clip 62 into the slots 32 of the aperture 26 from the upper surface 28 of the housing 22, to form the interlock and place the retention clip 62 in the initial position within the housing 22 and in the open configuration. In these embodiments, the fastening assembly 20 may be assembled before, after, or concurrently with locating the housing 22 on the component 110 and disposing the through-hole 34 about the stud 112 thereof (or otherwise inserting the stud 112 into the through-hole 34). In other embodiments, the fastening assembly 20 is utilized in a pre-assembled or otherwise ready-to-use state, comprising the retention clip 62 in the initial position within the housing 22 and in the open configuration. In these embodiments, pre-assembled fastening assembly 20 is disposed on the on the component 110 such that the through-hole 34 is disposed about the stud 112.

As introduced above, the installation method also comprises placing the retention clip 62 into the final position, thereby capturing the stud 112 within the housing 22. Typically, placing the retention clip 62 into the final position comprises slidably inserting the legs 68 of the retention clip 62 mostly, or fully, into the slots 32 within the housing 22, such that the locking ribs 46 are disposed within the locking apertures 70 and the retention clip 62 is allowed to return to the closed configuration whereby the locking pawls 72 are biased against and engage the stud 112 within the through-hole 34 and prevent removal of the stud 112 therefrom, thereby installing the fastening assembly 20 on the component 110.

In some embodiments, the installation method comprises verifying the installation of the fastening assembly 20 on the component 110. Typically, verifying the installation comprises reading, or attempting to read, the barcode 38 through the code window 66. In some embodiments, verifying the installation comprises scanning, or attempting to scan, the barcode 38 with a code scanner. The code scanner is not particularly limited, and may comprise, or be, any device capable of reading the barcode 38 such that meaningful information can be interpreted therefrom. Examples of such code scanners include purpose-made barcode scanners, smart phones, personal computers, electronic cameras, and other such devices. In certain embodiments, the method further comprises recording the verification, e.g. in an electronic log, which may be automated and/or manually populated with the results of the verification.

In certain embodiments, the installation method comprises securing the tie strap 100 to the housing 22, e.g. via the tie strap receiver 54. In some such embodiments, securing the tie strap 100 comprises disposing the elongate body 104 into the tie strap window 52 of the housing 22. It is to be appreciated that the tie strap 100, when included as a component of the fastening assembly 20, may be secured to the housing 22 at any time during assembly of the fastening assembly 20 or installation of the fastening assembly 20 onto the component 110.

A method of anchoring the tie strap 100 to the component 110 with the fastening assembly 20 (the "anchoring method") is also provided. The anchoring method generally comprises installing the fastening assembly 20 on the component 110 according to the installation method, as well as securing the tie strap 100 to the housing 22, thereby anchoring the tie strap 100 to the component 110 via the fastening assembly 20. In some embodiments, while not shown, the anchoring method further comprises securing one of more elements with the tie strap 100 anchored to the component 110 via the fastening assembly 20, thereby fastening the one of more elements to the component 110. In these embodiments, the element(s) to be secured are not limited, and may comprise any object capable of being secured via the tie strap 100. For example, in some embodiments, the element is an elongate object such as a wire or cable. While not shown, a system comprising one or more elements secured to the housing 22 of the fastening assembly 20 via the tie strap 100 is also provided, and typically comprises the fastening assembly 20 installed on onto the component 110.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular. Further, it is to be understood that the terms "right angle," "orthogonal," and "parallel" are generally employed in a relative, and not an absolute sense, if/when employed herein. Similarly, directional terms, such as "vertical," "horizontal," "top," "bottom," "upper," "lower," "inner," "inwardly," "outer" and "outwardly," are used to assist in describing the invention based on the orientation of the embodiments shown in the illustrations of the Figures. The use of directional terms should not be interpreted to limit the invention to any specific orientations.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A fastening assembly for attachment of a component, the fastening assembly comprising:
   a housing defining an aperture that extends between opposing upper and lower surfaces and comprises a pair of slots disposed about and connected together via a central through-hole adapted to receive a component from the lower surface, the housing comprising a spacer extending inwardly toward the through-hole between the slots and presenting a code region at the upper surface adjacent the through-hole, and a locking rib projecting outwardly into one of the slots from the spacer between the upper and lower surfaces; and
   a substantially U-shaped retention clip adapted to be coupled to the housing, the retention clip comprising a clip body defining a code window adapted to be disposed about the code region of the housing, a pair of legs extending from the body on opposing sides of the code window and adapted to be inserted into the slots of the aperture from the upper surface, a pair of locking pawls extending inwardly and toward the body from the legs and adapted to receive and retain a component therebetween, and an elongated locking aperture defined by one of the legs and adapted to receive and engage the locking rib of the housing to form an interlock therewith, the retention clip being changeable between an open configuration whereby the locking pawls are spaced apart such that a component may be freely inserted therebetween and a closed position whereby the locking pawls are biased together and may capture and retain a component therebetween;
   wherein the retention clip is slideably and linearly moveable in the aperture of the housing between an initial position in which the retention clip is in the open configuration and the clip body is spaced apart from the upper surface of the housing and a final position in which the retention clip is in the closed configuration, the clip body is adjacent the upper surface of the housing such that the code window is disposed about the code region, and the locking rib is interlocked with the locking aperture.

2. The fastening assembly of claim 1, wherein the code region of the housing comprises a barcode, wherein the clip body is configured to at least partially obscure the barcode in the initial position, and wherein the barcode is readable through the code window in the final position.

3. The fastening assembly of claim 1, wherein the locking rib is configured to exert a force pushing apart the legs of the retention clip in the initial position, and wherein the locking rib is configured to not exert a force pushing apart the legs of the retention clip in the final position.

4. The fastening assembly of claim 1, wherein the spacer is further defined as a first spacer extending inwardly toward the through hole from a first end of the housing, and wherein the housing further comprises a second spacer extending inwardly toward the through hole between the slots from a second end of the housing opposite the first end, such that the aperture of the housing is substantially H-shaped.

5. The fastening assembly of claim 4, wherein the code region of the housing is further defined as a first code region presented by the first spacer at the upper surface and the code window of the clip body is further defined as a first code window adapted to be disposed about the first code region, wherein the housing further comprises a second code region presented by the second spacer at the upper surface, wherein the clip body further defines a second code window adapted to be disposed about the second code region of the housing.

6. The fastening assembly of claim 5, wherein the housing comprises a barcode presented by at least one of the first and second code regions, and wherein the clip body is configured to at least partially obscure the barcode in the initial position, and wherein the barcode is readable through the code window in the final position.

7. The fastening assembly of claim 4, wherein the locking rib is further defined as a first locking rib projecting outwardly into one of the slots from the first spacer of the housing and the locking aperture defined by one of the legs is further defined as a first locking aperture adapted to receive and engage the first locking rib of the housing, wherein the housing further comprises a second locking rib projecting outwardly into one of the slots from the second spacer between the upper and lower surfaces, and wherein the retaining clip further comprises a second elongated locking aperture defined by one of the legs and adapted to receive and engage the second locking rib of the housing.

8. The fastening assembly of claim 4, wherein the housing comprises a pair of locking ribs projecting outwardly into the slots from opposing sides of each of the first and second the spacers, each locking rib being elongated in a direction of slideable and linear movement of the legs of the retention clip within the aperture of the housing and extending between a first end proximal upper surface and a second end proximal the lower surface surfaces.

9. The fastening assembly of claim 8, wherein each leg of the retaining clip defines a pair of locking apertures disposed at opposite sides of the locking pawl, where each locking aperture is adapted to receive and engage one of the locking ribs of the housing to form an interlock therewith.

10. The fastening assembly of claim 1, wherein the pair of locking pawls is further defined as a first pair of locking pawls, wherein the retention clip further comprises a second pair of locking pawls extending inwardly and toward the body from the legs between the first pair of locking pawls and the body and being adapted to receive and retain a component therebetween, and wherein the second set of locking pawls are configured to be spaced apart to allow insertion of a component therebetween in the open configuration and biased together to capture and retain a therebetween in the closed configuration.

11. The fastening assembly of claim 1, wherein the component is further defined as a stud bolt such that the central through-hole of the housing is adapted to receive the stud bolt from the lower surface and the locking pawls of the retention clip are adapted to receive the stud bolt when in the open configuration and capture the stud bolt when in the closed configuration.

12. The fastening assembly of claim 1, wherein the housing further comprises a tie strap receiver configured to hold a tie strap.

13. The fastening assembly of claim 12, wherein the tie strap receiver extends outwardly from the upper surface of the housing and defines a tie strap window adapted to receive a tie strap therethrough.

14. The fastening assembly of claim 13, wherein the tie strap receiver: (i) comprises a plurality of tie strap windows; (ii) is adapted to receive a tie strap in more than two directions; (iii) is configured to retain a portion of a tie strap substantially perpendicular to the lower surface of the housing; or (iv) any combination of (i)-(iii).

15. The fastening assembly of claim 12, further comprising a tie strap, wherein the tie strap comprises an elongate body adapted to be disposed through the tie strap receiver.

16. The fastening assembly of claim 1, wherein: (i) the housing comprises a polymeric material; (ii) the housing is unitary in construction; or (iii) both (i) and (ii).

17. The fastening assembly of claim 1, wherein: (i) the retention clip comprises a metal; (ii) the retention clip is unitary in construction; or (iii) both (i) and (ii).

18. A method of installing a fastening assembly on a component, the method comprising:

providing the fastening assembly of claim 1;

inserting the legs of the retention clip into the slots of the aperture of the housing from the upper surface to place the retention clip in the initial position within the housing;

inserting a stud of a component into the through-hole of the aperture of the housing from the lower surface; and inserting the legs of the retention clip fully into the slots of the aperture to place the retention clip in the final position within the housing such that the locking pawls of the retention clip capture the stud in the through-hole of the housing and the code window of the retention clip is disposed about the code region of the housing, thereby installing the fastening assembly on the component.

19. The method of claim 18, wherein the code region of the housing comprises a barcode, wherein the clip body is configured to at least partially obscure the barcode in the initial position, and wherein the barcode is readable through the code window in the final position.

20. A method of anchoring a tie strap to a component with a fastening assembly, the method comprising:

installing a fastening assembly on a component according to the method of claim 18, wherein the housing further comprises a tie strap receiver that extends outwardly from the upper surface of the housing and defines a tie strap window adapted to receive and hold a tie strap therein;

providing a tie strap comprising a head and an elongate body; and disposing the elongate body of the tie strap through the tie strap window such that the elongate body of the tie strap is disposed within and retained by tie strap receiver.

* * * * *